O. G. RIESKE, T. BRENNAN, Jr., S. H. PHELPS & E. R. BEEMAN.
SCRAPER DEVICE FOR DISK DRILLS.
APPLICATION FILED NOV. 9, 1909.
975,459.
Patented Nov. 15, 1910.
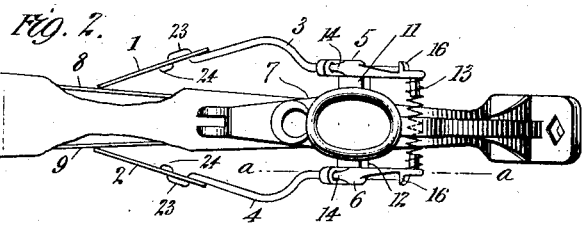
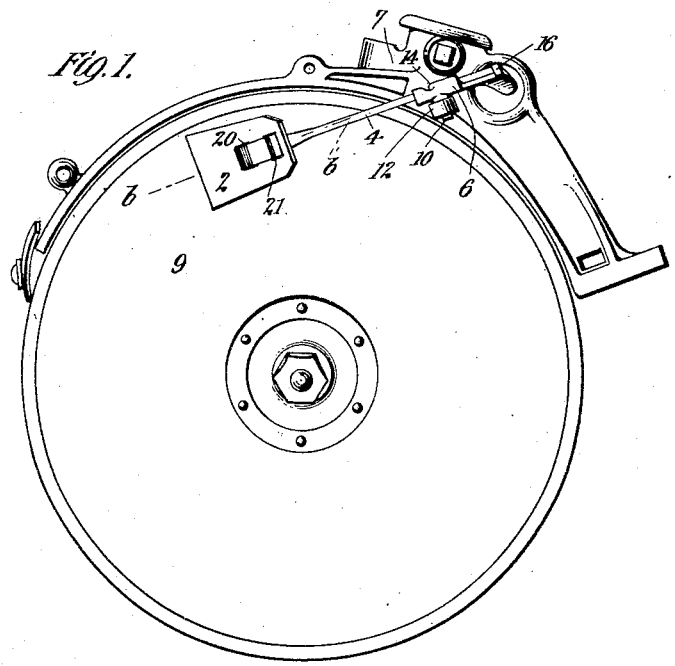
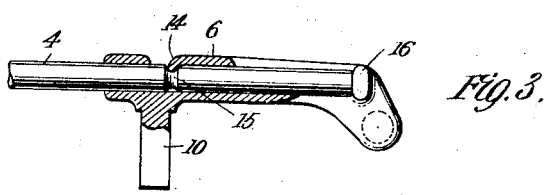
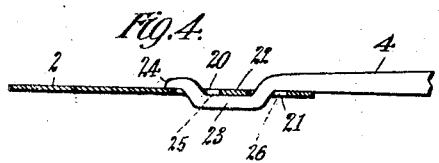
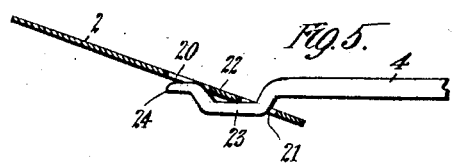
Witnesses:
Inventors:
OTTO G. RIESKE
THOMAS BRENNAN Jr.
SPENCER H. PHELPS
EDWIN R. BEEMAN
By their Attorney
P. T. Dodge

UNITED STATES PATENT OFFICE.

OTTO GEORGE RIESKE AND THOMAS BRENNAN, JR., OF ST. LOUIS PARK, AND SPENCER H. PHELPS AND EDWIN R. BEEMAN, OF MINNEAPOLIS, MINNESOTA, ASSIGNORS TO MONITOR DRILL COMPANY, A CORPORATION OF MINNESOTA.

SCRAPER DEVICE FOR DISK DRILLS.

975,459.  Specification of Letters Patent.  Patented Nov. 15, 1910.

Application filed November 9, 1909. Serial No. 527,011.

*To all whom it may concern:*

Be it known that we, OTTO G. RIESKE and THOMAS BRENNAN, Jr., of St. Louis Park, county of Hennepin, and State of Minnesota, and SPENCER H. PHELPS and EDWIN R. BEEMAN, of Minneapolis, county of Hennepin, and State of Minnesota, have jointly invented a new and useful Improvement in Scraper Devices for Disk Drills, of which the following is a specification.

This invention relates to grain drills in which the furrows to receive the grain, are formed by opening-disks, and the invention has special reference to the scraper device, which in machines of this type consists usually of two scraper blades held by spring pressure against the outer faces of the disks, and acting as the disks are rotated to dislodge any adhering soil and keep the disks clean.

The present invention consists of various improvements in scraper devices of this character, and is directed more particularly to the form of and manner of mounting the scraper holders and scraper arms to insure a close yielding contact of the edge of the blades against the face of the disks, notwithstanding any unevenness or irregularities that may exist in the disks' rotation.

The invention consists also in improved means for attaching the scraper blades to their supporting arms, whereby the blades may be readily removed and reversed to bring a fresh surface or edge in contact with the disks when the blades become worn.

In the accompanying drawings:—Figure 1 is a side elevation of a pair of disk openers and the attached boot or frame, having our improved scraper device applied thereto. Fig. 2 is a top plan view of the same. Fig. 3 is a vertical sectional elevation on an enlarged scale on the line *a—a* of Fig. 2. Fig. 4 is a section on the line *b—b* of Fig. 1, showing the manner of attaching the scraper blade to its arm. Fig. 5 is a similar view illustrating how the blade is detached for reversal.

Referring to the drawings:—Our improved scraper device comprises a pair of scraper blades 1 and 2, arms 3 and 4 to which the blades are connected, and holders 5 and 6 in which the arms are mounted, the holders being so sustained by a boot or frame 7 that the blades will act on the outer faces of the two disks 8 and 9 respectively.

The holders 5 and 6 are elongated in form, and provided with longitudinal bearing sockets, in which the forward ends of the arms are loosely mounted to turn or swivel on a longitudinal axis, and each of the holders is formed with a depending stud 10, mounted loosely in bearing openings in lugs 11 and 12 projecting laterally from the opposite sides of the boot, the construction being such that the holders may rock to and from the disks on axes extending transversely with reference to the axes on which the arms swivel. As a result, the scraper blades are capable of two motions, one a bodily motion to and from the disks, and the other a tipping or rocking motion, the blades being normally held yieldingly and flatly against the faces of the disks by means of a spiral spring 13 mounted between the forward ends of the holders and tending by its expansion, to urge the opposite ends of the holders inward and consequently the blades against the disks. These two movements of the blades as described, subject to the action of the spring, cause the blades to contact closely and flatly and in a yielding manner with the surface of the disks, and compel them to follow with certainty any unevenness in the rotation of the disks, due to jar, strain, or other causes. This action of the blades is of great importance and advantage in working in tough or sticky soils, as it effectually prevents the soil, which in some localities carries fine wiry fibers, from adhering to the surface of the disks, and thereby avoids the liability of the fibers working in between the blades and the disks which would render the scraper blades inoperative.

In order that the arms may be prevented from escaping endwise from the holders and be given support therein, while at the same time be capable of the swiveling action described, the holders are each provided with a confining finger 14 engaging loosely in a peripheral groove 15 in the arm; and at their forward ends the holders are formed each with a shoulder or abutment 16, against which the ends of the arms bear, these abutments thus acting to receive the end-thrust of the blades caused by the contact of the adhering soil therewith.

The blades are connected with the arms in such manner that they may be detached and reversed side for side, when by reason of the movement of the disks against the edge of the blades, the latter become worn and fail to keep the disks clean. To effect this result the blade, as shown more particularly in Figs. 4 and 5, is provided with two slots or openings 20 and 21 arranged side by side and leaving between them a connecting bar 22, and the end of the arm is flattened and formed with an offset portion 23 and a terminal finger 24. The parts thus formed are adapted to be firmly but detachably interlocked, as shown in Fig. 4, where it will be seen that the offset portion bears at the side of the cross-bar 22 of the blade, with the body of the arm and terminal finger bearing on the opposite side of the blade adjacent the slots 20 and 21 respectively, the parts being wedged tightly in this position and held by the inherent spring of the material. The form and relation of the slots and arm are such that when the parts are thus firmly interlocked, there will be sufficient clearance between the ends of the slots and ends of the offset portion, as at 25 and 26, to permit the blade to be shifted endwise far enough to free the end of finger 24, which action will release the blade. It may then be removed by tipping it to the position of Fig. 5 to pass the finger through the slot 20, after which the blade may be entirely removed. It may then be reversed side for side to bring the opposite edge against the disk, and interlocked with the arm by the reversal of the operations just described, the slot 21 being first passed over the end of the arm to the position of Fig. 5, then slot 20 passed over the finger 24, and finally the blade forced endwise to the position of Fig. 4, thereby causing the finger to engage at one side of the blade and the offset 23 on the opposite, and in this manner binding the parts rigidly but detachably together. It is understood that to release the blade for removal, as above described, it will be necessary to strike the forward edge of the same forcibly in order to shift it endwise.

In the accompanying drawings, we have illustrated our invention, and in the specification described the same in the form and manner which in actual practice have been found to answer in a satisfactory manner the results to be attained, but we wish to be understood that the invention is not limited to any particular or specific details except in so far as such limitations are specified in the claims.

Having thus described our invention, what we claim and desire to secure by Letters Patent of the United States, is:—

1. In combination with the frame and opening disks, scraper arm holders pivoted between their ends to the frame on opposite sides of the latter and adapted to rock to and from the disks, said holders being provided with longitudinal bearing sockets, scraper arms mounted at their forward ends in said sockets and movable therein around the longitudinal axes of the arms, means on the arms and holders adapted to retain the same in permanent engagement, scraper blades connected to the rear ends of said arms in fixed relations thereto, and a spring mounted between the forward ends of the scraper arm holders and acting to maintain the scraper blades yieldingly in contact with the disks.

2. In a disk scraper, the combination with a scraper-arm holder provided with a bearing socket and a confining finger, of a scraper arm mounted in the bearing socket and formed with a peripheral groove in which the confining finger loosely engages, and a scraper blade carried by the arm.

3. In a disk scraper, the combination with a scraper blade provided with a plurality of alined slots and a connecting portion therebetween, of a scraper arm extending through said slots from one side to the other and engaging said connecting portion for interlocking detachably with said blade, the said slots being elongated in the direction of the longitudinal axis of the arm to admit of the engagement or disengagement of the parts.

4. In a disk scraper, the combination with a scraper blade provided with a plurality of alined slots and a connecting portion therebetween, of a scraper arm extending through said slots from one side to the other and engaging said connecting portion for interlocking detachably with said blade, and bearing with spring pressure on opposite sides of said blade.

5. In a disk scraper, the combination of a scraper blade provided with alined elongated slots, a scraper arm adapted at its end to be passed through said slots and provided with an offset portion and a terminal finger acting by endwise movement of the blade, to forcibly engage the latter respectively on opposite sides, and also to disengage the same.

6. In a disk scraper, the combination with a scraper blade, of a scraper arm extending through said blade from one side to the other and detachably interlocked therewith, and coacting means on the blade and arm so formed relatively that said blade and arm may be separated, first by an endwise relative movement to release them, and second by a tipping movement to permit their separation.

In testimony whereof we have hereunto set our hands this 25th day of October 1909, in the presence of two witnesses.

OTTO GEORGE RIESKE.
THOMAS BRENNAN, Jr.
SPENCER H. PHELPS.
EDWIN R. BEEMAN.

Witnesses:
F. S. PRESTON,
LOUIS W. FULLER.